United States Patent [19]

Wisegerber

[11] Patent Number: 4,714,131

[45] Date of Patent: Dec. 22, 1987

[54] WAFFLE SAFETY DEVICE

[76] Inventor: Lester R. Wisegerber, 38 Brown La., Dayton, Tex. 77535

[21] Appl. No.: 853,192

[22] Filed: Apr. 17, 1986

[51] Int. Cl.$^4$ ............................................. B60R 25/10
[52] U.S. Cl. ..................................... 180/287; 116/33; 116/56; 446/414
[58] Field of Search ................. 180/287, 247; 446/413, 446/414, 420, 271, 422; 188/265; 116/33, 56

[56] References Cited

U.S. PATENT DOCUMENTS

| | | | |
|---|---|---|---|
| 530,584 | 12/1894 | Eccleston | 446/413 |
| 1,026,375 | 5/1912 | Tibbles | 180/247 |
| 1,322,171 | 11/1919 | Wherry | 180/287 |
| 3,718,202 | 2/1973 | Brock | 180/287 |
| 4,073,259 | 2/1978 | McCoy | 180/287 |

*Primary Examiner*—John J. Love
*Assistant Examiner*—Kenneth R. Rice
*Attorney, Agent, or Firm*—Arnold, White & Durkee

[57] ABSTRACT

A vehicle movement warning device particularly designed to deter vehicle theft by emitting a loud clatter if the vehicle is moved without authorization. Advantageously, the device also deters vehicle movement by providing a frictional impediment to movement, without damage to the vehicle. The device includes a pair of waffle surfaces, the first waffle surface being mounting to a wheel for rotation with the wheel. A releasable shift mechanism mounts the second waffle surface to the vehicle in a position for selective shifting movement into and out of engagement with the wheel-mounted waffle surface. Preferably, the shift mechanism comprises a spring biasing the second waffle surface into engagement with the wheel-mounted waffle surface and a solenoid for withdrawing and holding the second waffle surface out of engagement with the wheel-mounted waffle surface. A switch allows the vehicle driver to disconnect power to the solenoid, the waffle surfaces being biased into meshing engagement by the spring with power removed from the solenoid. Movement of the vehicle with the waffle surfaces meshed is frictionally impeded and produces a loud clatter as the undulations of the waffle surfaces slip past each other.

15 Claims, 6 Drawing Figures

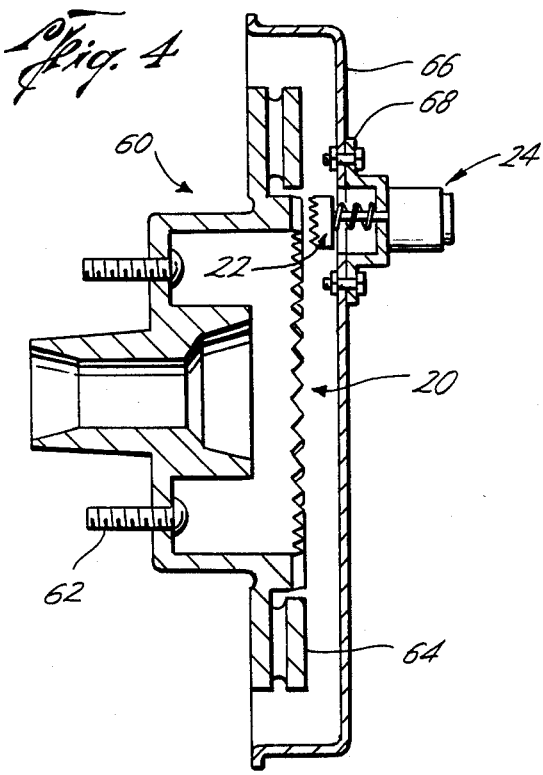
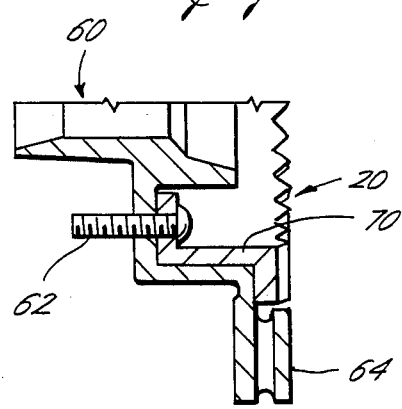
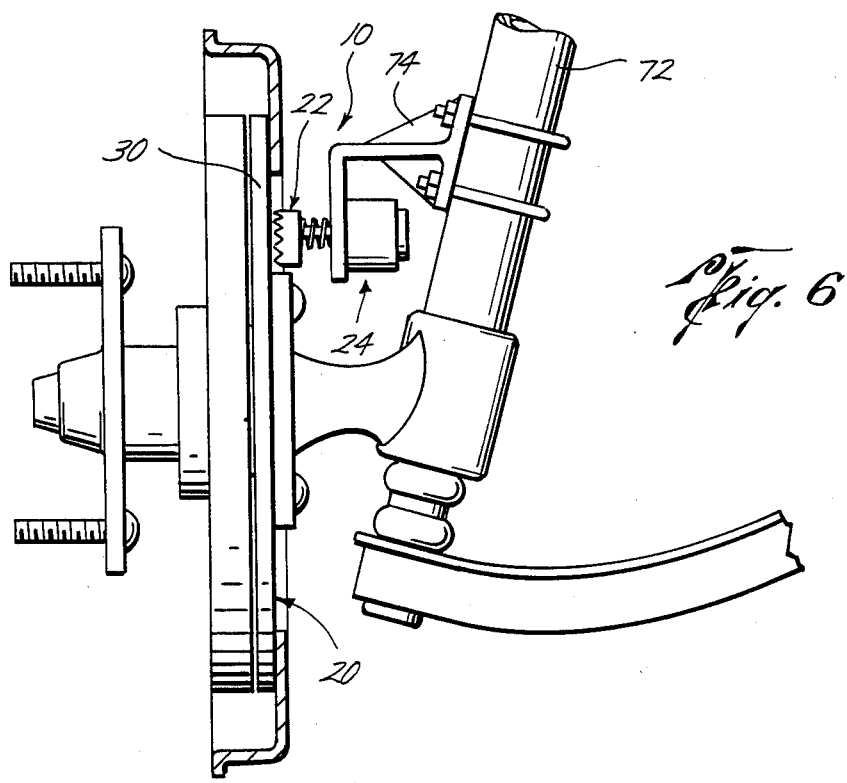

WAFFLE SAFETY DEVICE

BACKGROUND OF THE INVENTION

1. Field of the Invention

This invention relates to a vehicle anti-theft and movement deterrence device which is designed to impede vehicle movement and to provide a loud, audible clatter if the vehicle is moved. In particular, the present invention relates to a device having a pair of undulating waffle surfaces, one of the surfaces being coupled to a vehicle wheel for rotation therewith, the other waffle surface being coupled to the vehicle for selectable, releasable, meshing engagement with the first waffle surface.

2. Description of the Related Art

Automobile theft in the United States is a big business with over one million vehicles being stolen each year. Less than half of the stolen vehicles are ever recovered and the costs, both in insurance claims and in quality of life, are enormous. Many anti-theft devices have been constructed to varying degrees, which act as a deterrent to automobile theft. However, ingenious thieves have been quite successful in circumventing such past anti-theft devices.

Many past anti-theft devices comprise alarm systems which are set off if the vehicle is jarred or moved. Further, many other anti-theft devices include specialized access and starting barriers. Practically all anti-theft devices are useful in deterring automobile thefts, but no anti-theft device has proven totally successful as a deterrent to theft.

A problem left largely unaddressed by such past anti-theft devices, is preventing undesired vehicle movement. For example, many vehicles commonly slip out of gear or out of park, allowing undesired movement of the vehicle and possible damage to the vehicle or occupants.

SUMMARY OF THE INVENTION

The present invention represents an improvement over such past anti-theft devices and additionally helps to prevent inadvertent, undesired vehicle movement. The device of the present invention provides a pair of undulating waffle surfaces, one of the waffle surfaces being mounted to a vehicle wheel for rotation therewith and the other waffle surface being mounted adjacent the path of travel of the first waffle surface. The second waffle surface can be selectively positioned by the driver either into meshing engagement with the first waffle surface, or drawn away from the first waffle surface. With the second waffle surface drawn away from the first waffle surface, vehicle operation is normal. With the second waffle surface in meshing engagement with the first waffle surface, movement of the vehicle is impeded, but not prevented, and if the vehicle is moved, a loud audible clatter results as the undulating waffle surfaces slip relative to each other. Advantageously, if during vehicle movement the waffle surfaces are inadvertently engaged, a loud clatter results, but braking action is minimized to avoid an unsafe skidding condition of the vehicle.

Broadly speaking, the vehicle warning and movement deterrence device of the present invention is adapted to be coupled to one or more of the vehicle wheel assemblies. A first waffle surface is provided which is couplable to the wheel assembly for rotation in a path of travel with the wheel. A second waffle surface is provided which is coupled to a shifting mechanism and mounted to the vehicle adjacent the path of travel of the first waffle surface. Advantageously, the waffle surfaces have complemental undulations for meshing engagement of the surfaces with each other. The shift mechanism is operable by the driver for selective shifting of the second waffle surface into and out of operative meshing engagement with the first waffle surface.

Preferably, the shift mechanism includes a bracket for mounting a solenoid to the vehicle adjacent one of the wheel assemblies. The second waffle surface is carried by a piston which is captured in the solenoid, with a spring providing an outward biasing force to the second waffle surface away from the solenoid. The second waffle surface can be withdrawn against the biasing force of the spring into the solenoid by the driver by applying power to the solenoid. In the preferred embodiment, the vehicle has a numbered coding sequence which the driver must enter to withdraw the second waffle surface towards the solenoid.

The first waffle surface preferably comprises an annular ring mounted to the brake portion of the vehicle wheel assembly. This annular waffle ring is either cast integral with the brake assembly or includes an adapter mounting bracket for retrofitting vehicles. The annular waffle ring is easily configured for use with either disk brake rotors or brake drums.

The waffle surfaces have teeth-like undulations oriented at such an angle that the undulations of the waffle surfaces will mesh to impede movement of the wheel. Yet, if the vehicle is moved, the undulations will slip past each other with the second waffle surface riding towards and away the first waffle surface. It can be appreciated that when the waffle surfaces slip relative to each other, a loud audible clatter is made indicating that the vehicle is either being moved without authorization or is inadvertently rolling.

BRIEF DESCRIPTION OF THE DRAWINGS

FIG. 4 is a vertical sectional view of another alternative embodiment of the present invention adapted for use with a disk brake wheel assembly;

FIG. 5 is a fragmentary, vertical sectional view illustrating still another embodiment of the annular first waffle ring which is adapted for retrofitting to a disk brake assembly; and FIG. 6 shows yet another alternative embodiment in which the present invention is configured for use in a disk brake assembly with the solenoid and second waffle surface mounted to the steering column of the vehicle.

DESCRIPTION OF THE PREFERRED EMBODIMENT

Figure 1:
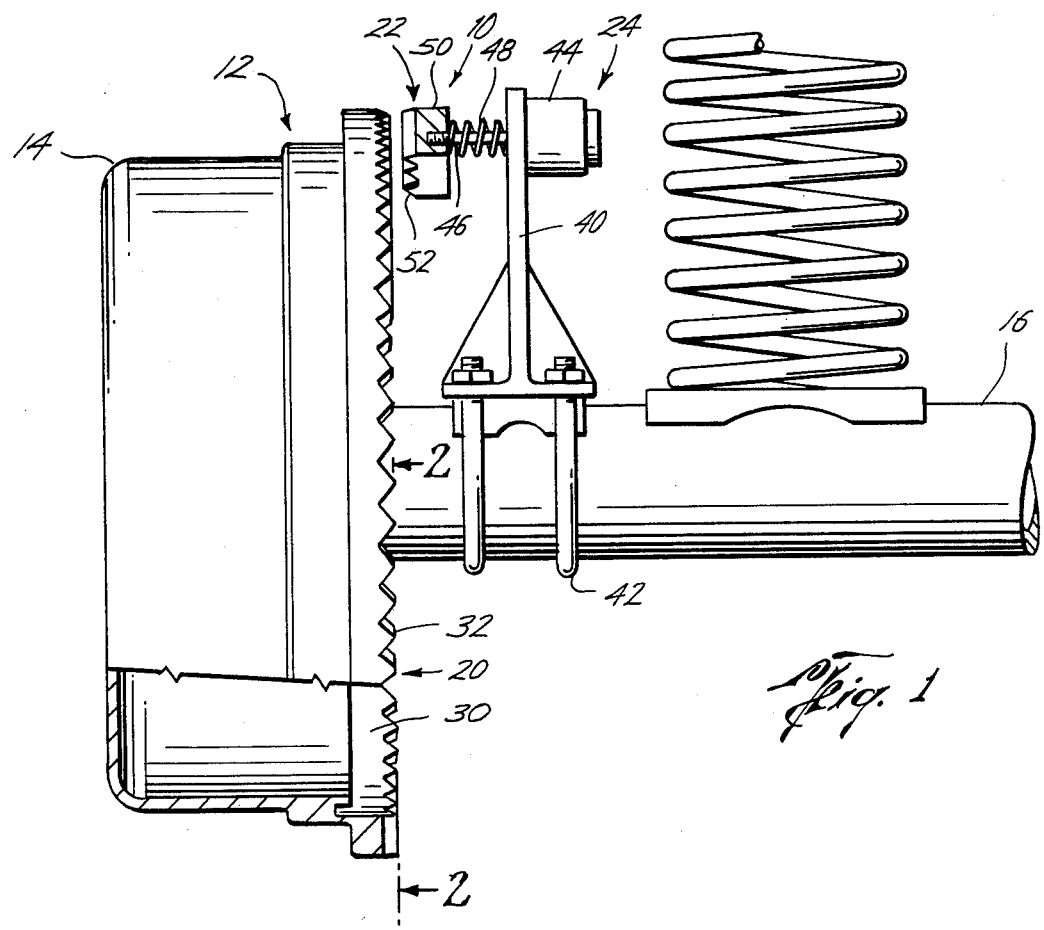
FIG. 1 is a fragmentary, elevational view in partial section of a wheel and axle assembly of a vehicle, and illustrates the mounting of the device of the present invention.

Turning now to the drawing, a vehicle movement warning and moving deterrence device 10 in accordance with the present invention is illustrated. As shown in FIG. 1, the device 10 is coupled to the vehicle adjacent the wheel assembly 12, which for clarity depicts only the brake drum 14 of the wheel assembly. FIG. 1 illustrates a typical automobile rear wheel adaptation in which a portion of the device 10 is coupled to brake drum 14 and another portion coupled to the axle 16.

Broadly speaking, the device 10 of the present invention includes a first waffle surface 20 adapted for rotatable movement with the wheel assembly 12, and a second waffle surface 22 adapted for coupling to the vehicle adjacent the path of travel of the first waffle surface 20. A shift mechanism 24 is coupled to the second waffle surface 22 for selectively and releasably moving the second waffle surface 22 towards and away from the first waffle surface 20.

In more detail, the first waffle surface 20 is in the form of an annular ring 30 (FIGS. 1 and 2) having a plurality of teeth or undulations 32 radially spaced along the outer periphery. In the preferred embodiment depicted in FIGS. 1 and 2, the annular ring 30 is cast integral with the brake drum 14.

Figures 2, 3:
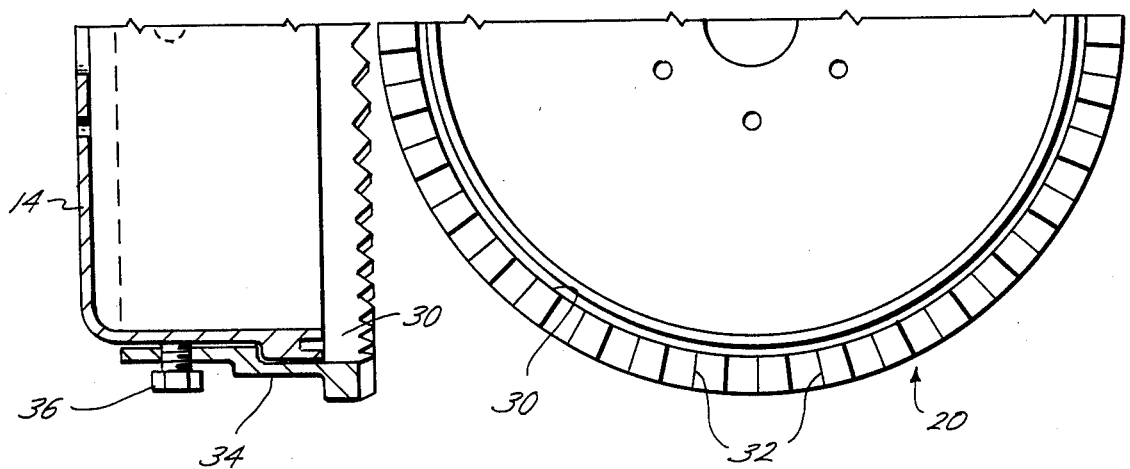
FIG. 2 is a fragmentary view of the annular first waffle surface ring of the present invention taken along line 2—2 of FIG. 1.
FIG. 3 is a fragmentary, sectional view of an alternative embodiment in which the annular first waffle surface ring includes an adapter collar for coupling to a brake drum.

FIG. 3 depicts an alternative embodiment of the first waffle surface 20 in which the annular ring 30 is connected along its outer periphery to an axially oriented mounting collar 34. The mounting collar 34 includes a plurality of set screws 36 extending therethrough, securing the collar 34 to brake drum 14 as shown in FIG. 3.

Turning again to the preferred embodiment illustrated in FIGS. 1 and 2, it will be seen that the shift mechanism 24 includes a connecting means in the form of mounting bracket 40 secured to the axle 16 by the U-bolts 42. Generally speaking, the shift mechanism 24 comprises an electrically-actuated solenoid 44 connected to the second waffle surface 22 by one or more pistons 46. Advantageously, a spring 48 is received around the piston 46 to outwardly bias the second waffle surface 22 towards the first waffle surface 20.

The solenoid 44 operates such that when electrical power is applied, the piston 46 is withdrawn towards solenoid 44 overcoming the bias of the spring 48. In the preferred embodiment, the solenoid 44 is activated by a computer controlled code sequence which the driver must input to a control board (not shown) to withdraw the second waffle surface 22. However, the electrical power of the solenoid 44 is interrupted by a simple two-way toggle switch (not shown) which releases piston 46 allowing shifting of the second waffle surface 22 towards the first waffle surface 20.

The second waffle surface 22 presents a relatively short, arcuate segment having a plurality of teeth or undulations 52 complementally angled to the undulations 32 of the first waffle surface 20. That is, the undulations 32, 52 operatively mesh when the second waffle surface 22 is shifted into contact with the first waffle surface 20. This operative mesh of the undulations 32, 52 provides a frictional impediment to movement of the first waffle surface 20, particularly at rest (static friction). However, the operable mesh of the undulations 32, 52 does not prevent movement of the drum 14, but allows the second waffle surface 22 to ride towards and away from the first waffle surface 20 against the bias of the spring 48.

Turning now to FIGS. 4-6, alternative embodiments of the device 10 are depicted in disk brake applications. In FIGS. 4-6, the same numerals have been applied to the components which are similar to the components of the preferred embodiment of FIGS. 1-2, with differences noted where applicable.

In FIG. 4, the first waffle surface 20 is cast integral with the disk brake assembly 60. In this configuration, the lugs 62 are conventional and simply project outwardly from the disk brake assembly 60 as shown. The first waffle surface 20 is preferably radially spaced inwardly from the annular braking surface 64 of the rotor. Depicted in FIG. 4, the brake calipers and pads (not shown) are coupled to the back plate 66 which circumscribes the rotatable disk brake assembly 60. In FIG. 4, the second waffle surface 22 and shift mechanism 24 are simply mounted to the back plate 66 by the mounting bracket 68. Actuation and operation of the shifting mechanism 24 is identical to the preferred embodiment depicted in FIGS. 1 and 2.

FIG. 5 depicts a slightly different embodiment of the disk brake assembly illustrated in FIG. 4. In the embodiment of FIG. 5, the first waffle surface 20 is not cast integral with the disk brake assembly 60, but rather includes an axially outwardly extending collar 70. Preferably, the collar 70 is not annular, but rather includes two or more prongs extending symmetrically inwardly. Each prong of the collar 70 is apertured as shown to receive the lug 62, providing connection of the waffle surface 20 to the disk brake assembly 60.

Finally, turning to FIG. 6, another embodiment is shown in which the device 10 of the present invention is configured for mounting adjacent the front wheel assembly of a foreign car. In FIG. 6, the shift mechanism 24 is coupled to a steering arm 72 of the vehicle by mounting bracket 74. The annular ring 30 of the first waffle surface 20 is cast integral with the disk brake assembly with the second waffle surface 22 mounted adjacent the path of travel of the ring 30 as shown. Of course, the ring 30 could be configured for retrofit to the disk brake rotor as illustrated in FIG. 5.

In use, the device 10 of the present invention operates not only as an anti-theft device, but also to impede inadvertent movement of the vehicle. When the driver of the vehicle exits, he simply flips the toggle switch (not shown) which removes power from the solenoid 44 (see FIG. 1). With power removed, the spring 48 biases the second waffle surface 22 into meshing engagement with the first waffle surface 20. When reentering the vehicle, the driver must program a secret code into a computer operated control panel (not shown) which again applies power to the solenoid 44. With power applied, the solenoid 44 captures the piston 46 against the reverse bias of the spring 48, to withdraw the second waffle surface 22 out of meshing engagement with the first waffle surface 20. Obviously, other types of conventional switching mechanisms can be used to supply or interrupt power to solenoid 44.

With the waffle surfaces 20, 22 engaged, frictional forces impede movement of the surfaces 20, 22 relative to each other. This frictional force is, of course, greatest during static conditions. The amount of compression of the spring 48 is varied to give the desired amount of biasing force of the second waffle surface 22 towards the first waffle surface 20. For example, if the device 10 is connected to the front wheels of a vehicle, the compressive force of the spring 48 is small to prevent lock-up of the front wheels of the vehicle if power is removed from the solenoid 44 and the waffle surfaces 20, 22 meshingly engaged during vehicle movement. In most applications, the compressive force of the springs 48 will be greatest at the rear wheels.

While the operative mesh of the surfaces 20, 22 frictionally impede movement of the vehicle, if the vehicle is moved, a loud audible clatter is the inevitable result. This clatter results from the undulations 32, 52 slipping past each other as the second waffle surface 22 rides towards and away from the first waffle surface 20 against the bias of the spring 48. In practice, this "clatter" has been found to be loud enough to give an effective warning signal that the vehicle is either being stolen or unintentionally moved.

The alternative embodiments in FIGS. 3–6 operate in almost the identical manner as the preferred embodiment depicted in FIGS. 1 and 2. The primary differences are only in the mechanisms for mounting device 10 for the particular application.

Those skilled in the art will appreciate that many different mounting arrangements and configurations are possible to adapt the device 10 of the present invention to the structural specifics of the vehicle in question. Of course, such simple modifications do not depart from the spirit and scope of the present invention.

I claim:

1. A vehicle movement warning and movement deterrence device adapted for coupling adjacent a vehicle wheel assembly, comprising:
   a first waffle surface having a plurality of undulations and operatively coupleable to the wheel assembly for rotation in a path of travel with the wheel assembly;
   a second waffle surface having a plurality of undulations complementally dimensioned for meshing engagement with the undulations of the first waffle surface; and
   shift means coupled to said second waffle surface for mounting the second waffle surface to the vehicle adjacent said path of travel and for selective shifting of said second waffle surface into operative meshing engagement with the first waffle surface, said undulations being configured and said shift means operable with the waffle surfaces in meshing engagement to impede movement of the first waffle surface relative to the second waffle surface and to create an audible clatter when the first waffle surface moves relative to the second waffle surface and the respective undulations slip past each other.

2. The device according to claim 1,
   the first waffle surface comprising an annular ring cast integral with a brake drum of the vehicle with the undulations oriented axially inwardly.

3. The device according to claim 1,
   the first waffle surface comprising an annular ring and attachment structure for connecting the ring to a brake drum of the vehicle with the undulations oriented axially inwardly.

4. The device according to claim 1,
   the first waffle surface comprising an annular ring cast integral with a rotor of a disc brake of the vehicle spaced radially inward from the rotor with the undulations in an axially inward orientation.

5. The device according to claim 1,
   the first waffle surface comprising an annular ring and attachment structure for connecting the ring to a disc brake rotors spaced inwardly from the rotor with the undulations in an axially inward orientation.

6. The device according to claim 1,
   the second waffle surface comprising an arcuate segment adapted for coupling to the shift means with the undulations oriented outwardly and the segment parallel to the path of travel.

7. The device according to claim 1,
   the shift means comprising an elongated piston coupled at one end to the second waffle surface, a solenoid operatively holding the piston other end, and a spring biasing the second waffle surface away from the solenoid.

8. The device according to claim 7,
   the shift means including bracket means for mounting to the axle of the vehicle.

9. The device according to claim 7,
   the shift means including structure for mounting the shift means to the disc brake rotor housing spaced axially inwardly from the disc brake rotor.

10. The device according to claim 7,
    the shift means including bracket means for mounting to the steering arm assembly of the vehicle.

11. An anti-theft warning device adapted for mounting to an automobile or the like, comprising:
    releasable slip means for providing an impediment to the movement of the automobile and for giving an audible warning if the automobile is moved, including
    a first waffle surface having a plurality of undulations and adapted for coupling to one of the automobile wheels for rotation therewith,
    a second waffle surface having a plurality of undulations,
    the undulating waffle surfaces being complementally configured for meshing overlap of the undulations with the waffle surfaces engaged,
    means for connecting the second waffle surface to the automobile adjacent the first waffle surface, and
    means for selectively, releasably, shifting the second waffle surfacae into and out of engagement with the first waffle surface, the undulations being configured and said shifting means operable such that movement of the automobile with the waffle surfaces engaged causes an audible clatter of the waffle surfaces as the undulations of the first waffle surface slip past the undulations of the second waffle surface.

12. The device in accordance with claim 11,
    the shifting means including means for releasably biasing the second waffle surface into engagement with the first waffle surface for shifting movement of the second waffle surface towards and away from the first waffle surface when the vehicle is moved.

13. The device in accordance with claim 12,
    said biasing means comprising a spring coupled to the second waffle surface.

14. The device in accordance with claim 11,
    the shifting means including a solenoid and a piston operatively coupled to the solenoid and second waffle surface, the solenoid being operable for withdrawing and holding the second waffle surface out of engagement with the first waffle surface.

15. The device in accordance with claim 11,
    the first waffle surface comprising an annular ring coupled to said one wheel for rotation in a generally planar path of travel with said one automobile wheel, and the second waffle surface comprising an arcuate segment connected to the automobile adjacent the planar path of travel.

* * * * *